United States Patent [19]
Keskes et al.

[11] Patent Number: 6,125,203
[45] Date of Patent: Sep. 26, 2000

[54] METHOD FOR AUTOMATICALLY DETERMINING STRATIFICATION BEDS IN A SITE

[75] Inventors: Naamen Keskes; Shinju Ye, both of Pau; Philippe Rabiller, Lescar, all of France

[73] Assignee: Elf Exploration Production, France

[21] Appl. No.: 09/011,112

[22] PCT Filed: May 27, 1997

[86] PCT No.: PCT/FR97/00925

§ 371 Date: Apr. 15, 1998

§ 102(e) Date: Apr. 15, 1998

[87] PCT Pub. No.: WO97/45757

PCT Pub. Date: Dec. 4, 1997

[30] Foreign Application Priority Data

May 31, 1996 [FR] France ................................ 96 06740

[51] Int. Cl.⁷ ...................................................... G06K 9/00
[52] U.S. Cl. ............................................ 382/171; 382/109
[58] Field of Search .................................. 382/100, 106, 382/108, 109, 172, 171, 170, 168, 173, 180–81, 190, 195, 203, 204–6, 209–217, 224–254, 256, 260, 266, 270–275, 293; 324/347; 702/10

[56] References Cited

U.S. PATENT DOCUMENTS 3,069,654 12/1962 Hough .
4,251,773 2/1981 Cailliau et al. ...................... 324/347
4,303,975 12/1981 Hepp ..................................... 364/422
5,299,128 3/1994 Antoine Jean-Noel et al. .

FOREIGN PATENT DOCUMENTS 2268274 1/1994 United Kingdom .

OTHER PUBLICATIONS

Deriche R: "Fast Algorithms for Low–Level Vision" IEEE Transactions on Pattern Analysis and Machine Intelligence vol. 12, No. 1, Jan. 1, 1990, pp. 78–87, XP000087783 cited in the application.

Primary Examiner—Bijan Tadayon
Assistant Examiner—M. Choobin
Attorney, Agent, or Firm—Ostrolenk, Faber, Gerb & Soffen, LLP

[57] ABSTRACT

Each of the N surface images, used to restore the borehole or the core sample surface image, is segmented into related components (C(12), C(11), ...) Which are grouped into related regions (C(8)), each touching both the right and left edges of the image. After smoothing out their contours, the related regions are represented in the form of an image, called bed image, representative uftlle stratification beds. The contours appearing on the N bed images are matched to construct the bed boundary sinusoidal curves. This is particularly useful in determining stratification of a geological site.

16 Claims, 5 Drawing Sheets

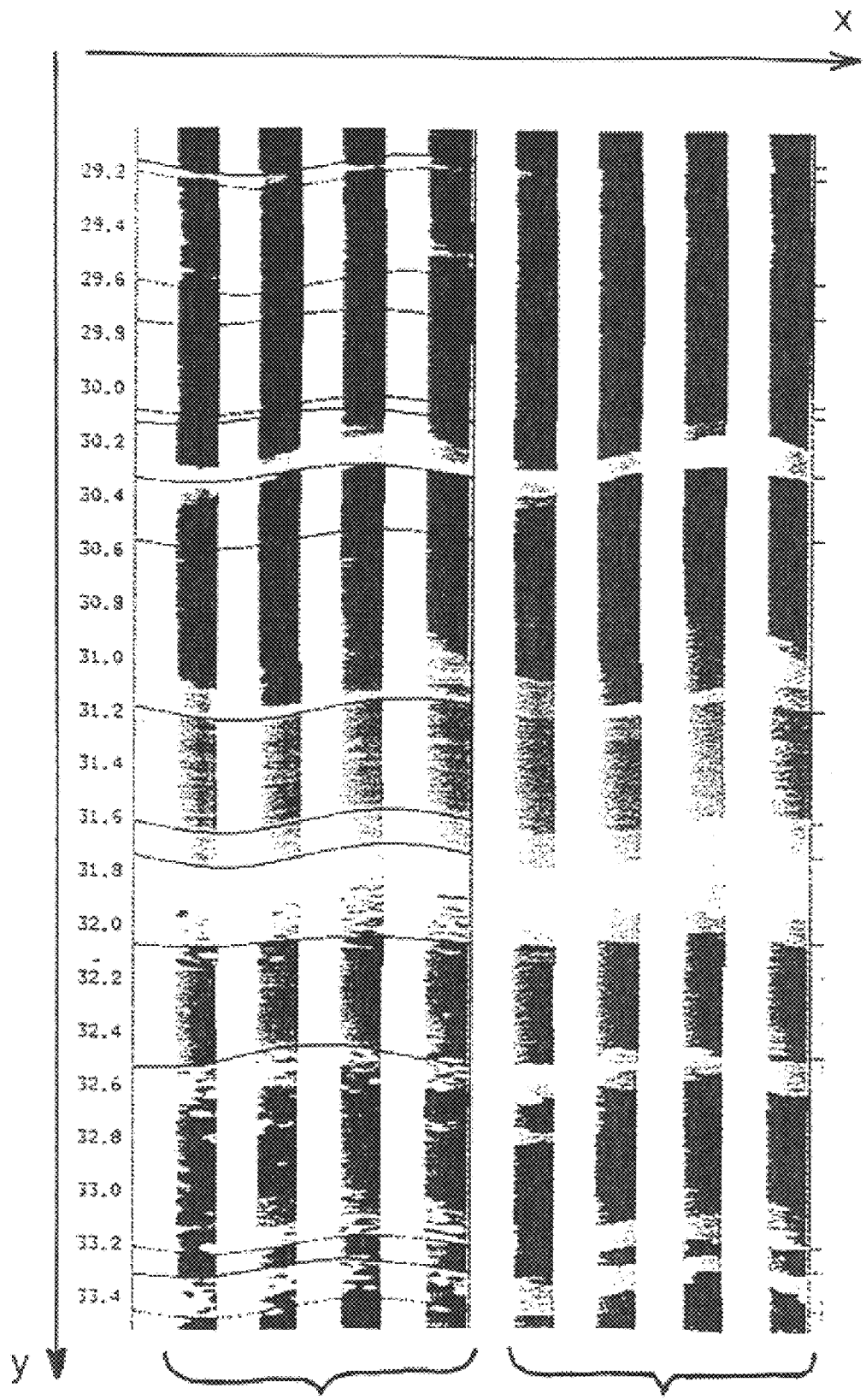

METHOD FOR AUTOMATICALLY DETERMINING STRATIFICATION BEDS IN A SITE

FIELD OF THE INVENTION

The invention relates to a method for automatically determining the bedding in a formation, in particular a geological formation, from images of the walls of boreholes or developments of core samples of this formation. It more particularly concerns the generation of images which very precisely represent the bedding in this formation and the boundaries of this bedding.

BACKGROUND OF THE INVENTION

The electrical images of walls of boreholes in a geological formation, as obtained for example using the tools which are referred to by the references FMI (Full-bore Formation Micro Imager) and/or FMS (Formation Micro Scanner) and have been developed by the company SCHLUMBERGER, are of great benefit to the oil industry because of the wealth of information which they contain. These images are used almost exclusively by structure analysts for fine determination of the geometrical characteristics of the bedding and fracture planes in boreholes.

The FMS and FMI tools make it possible to acquire electrical images from measurements of the local electrical conductivity of the wall of the borehole and, in order to do this, have four articulated arms, each equipped with a pad in the case of the FMS tool, or a pad and a flap (accompanied pad) in the case of the FMI tool. The pads of the FMS tool each have 16 electrodes, and the pads and flaps of the FMI tool each have 24 electrodes. The pads and flaps of the said tools are held against the wall of the borehole using a mechanical system, throughout the acquisition of the electrical images.

An electrical image of the wall of a borehole is a view of the wall of the borehole and, when the borehole is opened to develop the wall on to a plane, has a horizontal axis x representing the azimuthal distribution of the electrodes of the pads and a vertical axis y along which the depth (position) of the tool in the borehole is defined. An FMS or FMI electrical image of the wall in a borehole is reconstructed by 4 or 8 pad images. Since there are 16 electrodes on each pad of the FMS tool and 24 electrodes on each pad and each flap of the FMI tool, a pad (pad or flap) image is therefore formed by 16 or 24 columns (one column per electrode) and several thousand rows, each pixel of the image having a size of about 2.5 mm$^2$. The vertical sampling interval for the FMS or FMI tool is 2.5 mm, and the lateral sampling shift is 3.8 mm for the FMS tool and 2.5 mm for the FMI tool. More generally, each pad image may be considered, in the aforementioned (x,y) axis system, as consisting of p sample columns (p represents the number of electrodes of the pad), which are each arranged along the y axis and are spaced apart along the x axis by a distance corresponding to the lateral sampling shift, the samples of each column being separated from one another by a distance corresponding to the sampling interval of the tool.

The electrical image is analysed for planar heterogeneities and point heterogeneities. Planar heterogeneity includes the bedding planes as well as the fracture plane of the geological formation which intersect the bedding; the rest of the electrical image represents the point heterogeneities, that is to say the variations which are associated with variations in petrophysical parameters (porosity) or variations in sedimentological parameters (for example bioturbations).

In terms of image analysis, the planar heterogeneities present on the electrical images can be categorized by their conductivity relative to the background of the image, their sharpness (grey scale contrast), their organization (isolated or grouped by family), their frequency (high or low frequency according to direction and depth) and their visibility (visible on all the pad images or only on some of them).

Distinction can be made between four important plane types, which have particular characteristics on the electrical image, namely:

planes which are recognized by the low-frequency variation in the background of the image and which are visible on all the pads, the said planes being identified as the bedding boundaries;

repetitive high-frequency planes, generally with low contrast, always organized by family and visible on all the pads, the said planes representing layering and lying within the beds;

planes which cut the bedding, which have a very high conductivity, are well contrasted and are isolated or organized by family, the said planes being, for the most part, attributable to open fracture planes impregnated with conductive mud; and planes which also cut the bedding planes, are more or less isolated, conductive or resistive, often less contrasted and generally visible on all the pads, the said planes being interpreted as plugged fracture planes and having a conductivity which depends on the nature of the plugging agent (cement).

When a plane, which may be one or other of the aforementioned planes, intersects a cylindrical borehole wall whose axis is not perpendicular to the plane, the intersection is seen on the image of the borehole wall as a sinusoid with equation y=d+A sin (x+$\phi$), in which the amplitude A and the phase $\phi$ correspond respectively to the dip and the azimuth of the plane, d being the depth at which the sinusoid is located.

The concept of a "bed" is one of the fundamental concepts used by geologists on site or by sedimentologists, who work on core samples of the geological formation, for studying the facies of sedimentary units. The beds are defined as being low-frequency planar heterogeneities. They are generally more highly contrasted and much thicker than the layering, and their thickness can vary greatly, for example, a few centimetres to a few meters. The bed boundaries can be marked by grey-scale contrasts exhibiting an abrupt transition or a smooth transition; they may also be characterized simply by a change in texture.

Manual picking of the bedding planes on the borehole wall images is a basic skill, but one which proves very complex and tedious.

Automatic plane recognition from electrical borehole wall images also entails significant difficulties, on the one hand due to the low image coverage factor (an image divided into 4 or 8 pad images corresponding to a coverage factor of 40% to 80%), and on the other hand due to the interference which occurs between the geological heterogeneities. If the coverage factor of the image were 100%, the problem of recognizing the sinusoids describing the intersections of the planes with the wall of the borehole could be likened to a simple problem of extracting lines from the images. However, for a low image coverage factor as mentioned above, this problem becomes a problem, which is much more complex to solve, of recognizing sinusoids defined by portions, and furthermore with additional constraints connected with the vertical spacing between the pad images.

Two methods have been described for automatically determining dips and azimuths of the planes intersecting a borehole drilled in a geological formation, on the basis of wall images of the said borehole, one using matching between the current lines (contours) in the case of electrical images (J. N. ANTOINE and J. P. DELHOMME: "A method to derive dips from bed boundaries in borehole images", Paper SPE 20 540 Ω (1990), pages 121 to 130, and also U.S. Pat. No. 5,299,128), and the other resorting to the HOUGH transform (U.S. Pat. No. 3,069,654) to process acoustic images (D. TORRES, R. STRICKLAND and M. GIANZERO: "A new approach to determining dip and strike using borehole images", SPWLA, $31^{st}$ Annual Logging Symposium, Jun. 24–27, 1990).

However, no method has yet been proposed which satisfactorily solves the problem of determining the bedding in a formation, in particular a geological formation, from images of the wall of a borehole made in the said formation or, which is equivalent, from images of the side surface of core samples of this formation.

SUMMARY OF THE INVENTION

The invention relates to a method which provides an effective solution to the aforementioned problem, the said method making it easy to determine the bedding boundaries and making it possible to recognize the said beds irrespective of their type and scale.

The method according to the invention is a method for automatically determining the bedding in a formation, in particular a geological formation, from images of boreholes or developments of core samples of this formation, each image being representative of a slice of the side wall of the borehole or of the core sample, with reference to a vertical axis y for depth and a horizontal axis x for azimuth, and being defined by a plurality of traces or columns, each of which is directed along the y axis from points spaced along the x axis and represents the value of a parameter associated with a characteristic of the said wall, measured as a function of depth, the side wall of the borehole or of the core sample being reconstructed by combining N wall images.

The method according to the invention is characterized in that it consists in:

segmenting each of the N wall images which are used to reconstruct the image of the side wall of the borehole or of the core sample, into a first set of connected components, each connected component consisting of a homogeneous zone of points which is obtained by grouping points of the traces of the wall image in such a way that the difference in the values taken by a criterion associated with the imaged characteristic, for example a parameter, in particular amplitude, associated with the imaged characteristic, at any two neighbouring points in the said zone has a value below a threshold, assigning a unique coefficient to all the pixels in a given connected component, the said coefficient being, for example, the mean value of the parameter, in particular amplitude, associated with the imaged characteristic for the trace points grouped in the said connected component, converting the first set of connected components into a second set consisting only of connected components, referred to as connected regions, which each touch the two edges, right and left, of the image, the said connected regions consisting of all the connected components forming connected regions which are already contained in the first set, and also connected regions which are formed from the connected components of the first set which do not each touch the two edges, right and left, of the image, referred to as connected zones, by merging a given connected zone with the closest neighbouring connected zone, carrying out the merge gradually and, after each merge of two connected zones, reassigning a new coefficient to the resultant connected zone before carrying out a new merge using the remaining connected zones including the said resultant connected zone, for each pair of consecutive connected regions, generating a smoothed contour marking the boundary of the two connected regions of the said pair by using contour tracking to find an upper envelope contour and a lower envelope contour for the said boundary and by keeping as the smoothed contour that of the two envelope contours which gives a lower variation in the level of the vertical shift; and producing in the (x,y) axis system an image formed by the connected regions with smoothed contours which are kept, this image being referred to as the bed image associated with the wall image subjected to the segmenting, and the contours between connected regions present on this bed image, referred to as bedding contours, each being representative of a portion of the intersection of a bedding plane with the side wall of the borehole or of the core sample.

A further option consists in aggregating each connected region having smoothed contours, for which the number of constituent points is below a threshold, with the closest neighbouring connected region having smoothed contours, for example the one having the closest mean value of the parameter.

When the coefficient assigned to each connected component is the mean value of the parameter, in particular amplitude, associated with the imaged characteristic for the trace points grouped in the said connected component, the aforementioned merge of the connected zones is carried out in particular by grouping a connected zone having a given mean value of the parameter with the neighbouring connected zone which has the next highest mean value of the parameter, carrying out the merge gradually, starting from the connected zone having the highest mean value of the parameter and in decreasing order of the parameter mean value assigned to each connected zone, and after each merge of two connected zones, recalculating the mean value of the parameter of the resultant connected zone before carrying out a new merge using the remaining connected zones including the said resultant connected zone.

A further step in the method according to the invention consists, using N bed images which are each derived from one of the N wall images used to reconstruct the side wall of the borehole or of the core sample, in matching the bedding contours of the same polarity which correspond to one another in the said N bed images, in order to construct sinusoids representing the bedding boundaries.

This step of constructing the sinusoids representing the bedding boundaries is advantageously implemented by carrying out a series of operations which, taking as a starting point the situation in which one bed boundary sinusoid $S_k$ has been determined, consists in:

a) selecting, from the bedding contours (referred to below as contours) which are present in the N bed images and lie below the sinusoid $S_k$, a first reference contour chosen from between the contour closest to $S_k$ and the contour encountered first after $S_k$;

b) determining, in the bed images which do not contain the first reference contour, the contours of the same polarity which correspond to the said first reference contour and represent N−1 primary contours;

c) constructing all the sinusoids which each contain the first reference contour and incorporate a number of the said primary contours ranging from 1 to N−1, and keeping as the optimum sinusoid $S_{01}$ the one of the said sinusoids which has the highest value $Q_1$, greater than a threshold $Q_s$, of a predefined criterion Q representative of the quality of the bedding planes;

d) selecting, on the bed image containing the first reference contour, a second reference contour consisting of the contour which has the same polarity as the first reference contour and immediately follows it;

e) determining, in the bed images which do not contain the second reference contour, the contours of the same polarity which correspond to the second reference contour and define N−1 secondary contours;

f) constructing all the sinusoids which each contain the second reference contour and incorporate from 1 to N−1 contours chosen from the set of all the primary and secondary contours, so that there is one contour per image for this choice, and keeping as the optimum sinusoid $S_{02}$ the one of the said sinusoids which has the highest value $Q_2$, greater than the threshold $Q_s$, of the quality criterion Q;

g) comparing the optimum sinusoids $S_{01}$ and $S_{02}$ and (i) validating the sinusoid $S_{01}$ as the bed boundary $S_{k+1}$ if the sinusoid $S_{02}$ is parallel to $S_{01}$ or if it crosses $S_{01}$ and has a value $Q_2$ of the quality criterion below $Q_1$, and marking the contours of the validated sinusoid $S_{01}$ on the N bed images as the bed boundary $S_{k+1}$ or (ii) rejecting the optimum sinusoid $S_{01}$ and eliminating the first reference contour if the optimum sinusoid $S_{02}$ crosses the sinusoid $S_{01}$ and has a value $Q_2$ of the quality criterion greater than the value $Q_1$; and h) repeating the series of operations a) to g) using the contours which are present on the N bed images and lie below the sinusoid $S_{k+1}$, in the case of operations according to g(i), or below the sinusoid $S_k$ in the case of operations according to g(ii), and as far as the last contours to be matched which are present on the N bed images.

In order to obtain the first bed boundary sinusoid $S_1$, the sequence of operations is carried out which consists in:

selecting, on each of the N bed images, the first bedding contour (referred to below as contour), choosing, from the said selected first contours, the contour having least depth as the reference contour, determining, in the bed images which do not contain the reference contour, the contours of the same polarity which correspond to the reference contour and define N−1 primary contours; and constructing the optimum sinusoid $S_1$ either (i) by picking or (ii) by applying the process according to points c) to g) described above.

The wall images which are processed using the method according to the invention may be images of boreholes or developments of core samples of various formations, and they more particularly consist of images, in particular electrical images such as FMS or FMI images, of the walls of boreholes drilled in a geological formation, or of side wall images of core samples of the said geological formation.

Before they are segmented into connected components, the wall images may, if need be, be subjected to filtering to remove planar heterogeneities of the open fracture type and thus to make it easier to detect the bedding. An example of a possible procedure for doing this is to look for the said fractures by using thresholding to detect local maxima, representative of the said fractures, on the image of the Laplacian produced from the corresponding wall image, then looking for the local minima (bases) adjacent to these local maxima on the image of the Laplacian and then performing an interpolation at the points of the image corresponding to the local maxima using the surrounding values. The image of the Laplacian may, in particular, be generated by the one-way DERICHE filter along the depth axis y (R. DERICHE: "Fast algorithms for low-level vision, IEEE Transactions on Pattern Analysis and Machine Intelligence, IEEE Trans. PAMI-12 No. 1 (1990), pages 78 to 87).

During the segmentation of each of the N wall images, which are used to reconstruct the image of the side wall of the borehole or of the core sample, into a set of connected components, the grouping of the points of the traces of the wall image into a homogeneous zone constituting a connected component can be carried out using any method known for this purpose. In particular, one possible procedure is such that the difference in the values taken by a parameter associated with the imaged characteristic, for example the amplitude of the said characteristic at any two neighbouring points in the said zone has a value below a threshold S and, during the said grouping, the difference between the value of the parameter at a new point to be grouped and the mean of the values of the said parameter for the points already grouped also has a value below a threshold $S_m$. Advantageously, the said grouping may be carried out in such a way that the difference in the values taken by the parameter associated with the imaged characteristic at two neighbouring points in the said zone along the x axis has a value below a threshold $S_x$, the difference in the values taken by the said parameter at two neighbouring points in the zone along the y axis has a value below a threshold $S_y$, and the difference between the value of the parameter at a new point to be grouped and the mean of the values of the said parameter for the points already grouped also has a value below a threshold $S_m$.

The said thresholds $S_x$ and $S_y$ may have identical values, for example when the wall image to be segmented is homogeneous, or conversely may have different values depending on the anomalies that may be encountered during the acquisition of the wall images. In particular, when the homogeneity between the traces of the wall images is poor, owing to vertical artifacts, the threshold $S_x$ has a value greater than $S_y$. Similarly, it is advantageous, in order not to generate connected components that are too small, for the threshold $S_m$ to have a value greater than $S_x$.

These thresholds may be fixed automatically using statistical methods, with histograms which relate to the images of the gradient in the x and y directions and are convoluted with masks $[-1, 1]$ and $[-1, 1]^T$. On the basis of experiments, the Applicant Company has found that thresholds $S_x$, $S_y$ and $S_m$ could advantageously be chosen such that $S_x = \gamma\ Gm^x$, $S_y = \gamma\ Gm^y$ and $S_m = \gamma\ Gm^{x'}$, with, in these formulae, $Gm^x$ and $Gm^y$ respectively denoting the means of the gradients of the wall images in the x and y directions, $Gm^{x'}$ representing the mean of the part greater than $Gm^x$ of the gradient along x and γ being a threshold coefficient which, in most cases, is chosen to be equal to 1.

As indicated above, during the step of constructing the bed boundary sinusoids, contour groups are formed which contain N contours, each taken from one of the N bed images, the said contours including a reference contour and N−1 associated contours which have the same polarity as the reference contour and correspond to the said contour. The term polarity of a contour is intended to mean the sign of the vertical gradient (along y) of the image at the various points along the contour.

In order to determine the said contours of the same polarity which correspond to one another in the N bed images, account is taken of the fact that, for a given bed, the differences $\Delta T_b$ in its thickness for the N bed images should be small, and a threshold is fixed below which the said differences should lie. In particular, the correspondence between the reference contour and the N−1 contours of the same polarity as the reference contour is effected in such a way that the variation in thickness of the bed bounded at the top by the said contours, when passing from the image containing the reference contour to any one of the other images, is below a threshold.

The quality criterion Q characterizing the bedding planes, which is used to find the optimum sinusoid among all the sinusoids which each contain the reference contour and incorporate from 1 to N−1 of the other contours associated with the said reference contour, is a composite criterion incorporating factors which, in particular, give account of the evenness or roughness of the plane, the bed homogenity measured by the mean vertical gradient of the image, the bed texture, etc.

For example, for a sinusoid matched from Qm contours, it is possible, according to the invention, to use a quality criterion Q defined by the equation:

$$Q = \lambda Q_{gd}^a \times Q_{ct}^b \times Q_{cr}^c \times Q_{dy}^d \times Q_m^e$$

in which:

λ denotes a normalization constant;

a, b, c, d and e represent weightings for the criteria to which they relate, it being advantageous for the said weightings to take the value 1, in the case of a, b, c and d, and the value 2 in the case of e;

Qgd represents the local contrast of the plane on the image of the gradient, the said local contrast giving account of the contrast between beds and being expressed by the equation Qgd=Mgd: Vgd, where Mgd is the mean of the gradients along the sinusoid estimated over the N wall images which are filtered by the filter appertaining to the one-dimensional gradient Gy along the y direction, and Vgd is the standard deviation of the images of the gradient, as it is calculated over all the N wall images;

Qct represents the overall contrast of the plane, the said overall contrast giving account of the low-frequency contrasts along the sinusoid and being expressed as the mean of the N/2 differences Δ with lowest absolute values taken from the series of the N differences Δ, each of which corresponds to one of the N images and represents the difference between the mean values of amplitude in the upper bed and the lower bed as they are calculated in two windows along the sinusoid just above and below the plane in the image in question;

Qcr represents the overall correlation between the N images, the said correlation giving account of the homogeneity of the texture enclosing the sinusoid and being defined by the equation:

$$Qcr = \frac{1}{\text{Max}(V_{up}, V_{lo}, V_\Delta)},$$

where Vup and Vlo are respectively the standard deviations of the amplitudes which are associated, on the one hand, with the upper bed and, on the other hand, with the lower bed, the standard deviations being calculated in the same window as for Qct, over the N images and $V_A$ is the standard deviation of the N differences Δ as they are defined above;

Qdy represents the planarity or roughness of the plane, which is expressed by the equation Qdy=1/ΔEy' where ΔEy measures the mean of the vertical differences between the points on the optimum matched sinusoid and the corresponding points which have contributed to the construction of the said sinusoid; and Qm represents the number of images retained for matching the sinusoid.

Other characteristics and advantages will emerge on reading the following description of an embodiment of the method according to the invention, presented with reference to the appended drawings, in which:

BRIEF DESCRIPTION OF THE DRAWINGS

FIGS. 6a and 6b represent bed boundary sinusoids marked on FMS images (FIG. 6a), and the images of the associated connected regions representing the bedding (FIG. 6b) for a second depth interval.

DESCRIPTION OF THE PREFERRED EMBODIMENT

Figure 1:
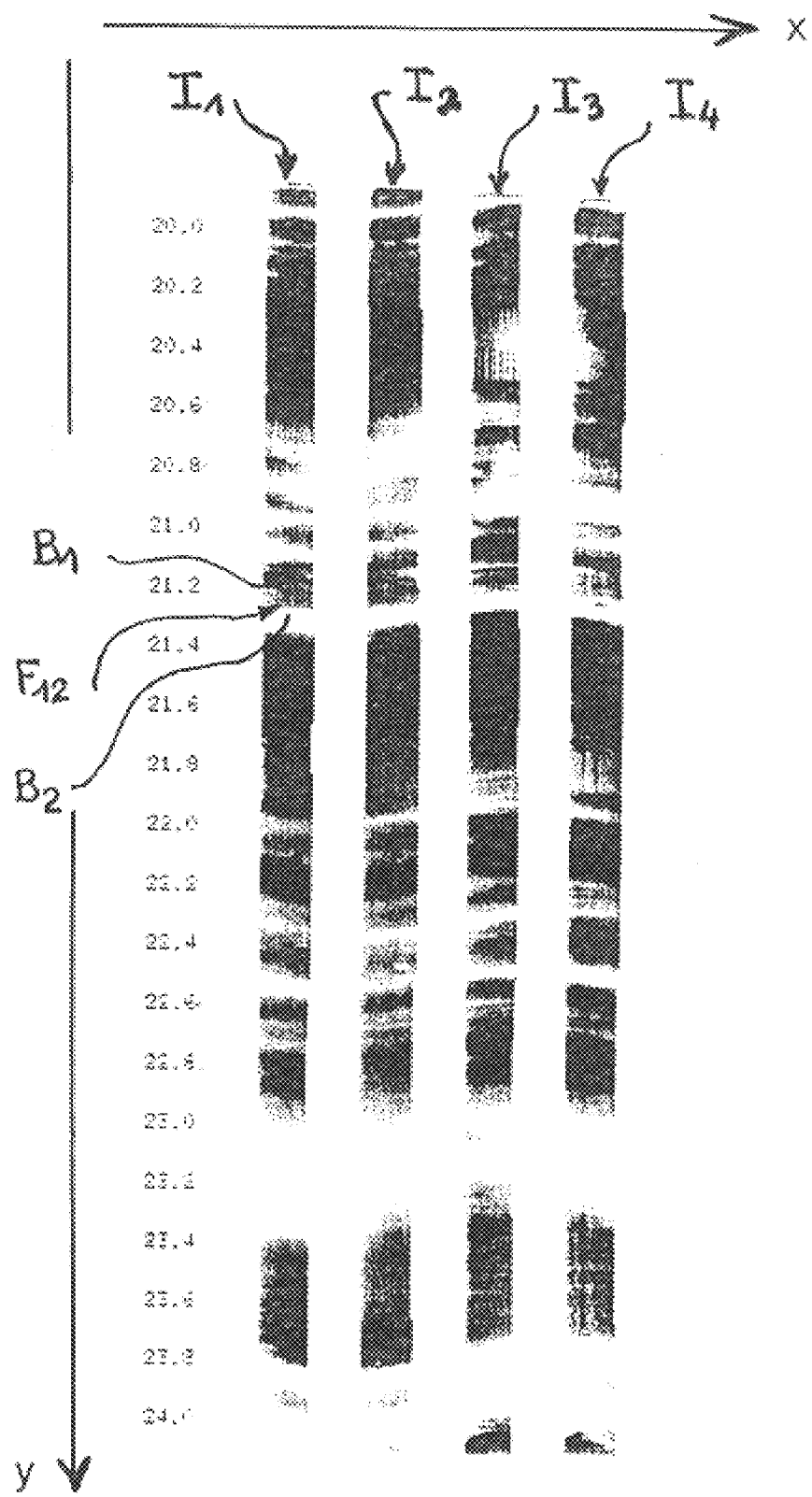
FIG. 1 shows a series of FMS electrical images of the wall of a borehole drilled in a geological formation, for a first depth interval.

A tool for measuring conductivity, for example of the FMS type equipped with four measuring pads, each provided with electrodes for measuring conductivity, as indicated above, is lowered through a borehole drilled in a geological formation and used to produce an electrical image of a part of the wall of the borehole. This technique is well known to those skilled in the art and will not therefore be described in detail. Each pad of the tool provides an electrical image in the form of a vertical slice including a plurality of traces or columns (as many traces or columns as there are electrodes in the measuring pad) which are directed along a vertical axis y graduated in depth and are spaced apart along a horizontal axis x graduated in azimuth, each trace having an amplitude representative of the borehole wall conductivity measured by the associated electrode and recorded as a function of depth. This provides four images $I_1$ to $I_4$ as represented in FIG. 1, for reconstructing the wall of the borehole. The images show zones, such as $B_1$ and $B_2$, which represent beds in the geological formation and are separated by contours such as $F_{12}$ which are each representative of a portion of a sinusoid tracing the intersection of a bedding plane, separating two consecutive beds, with the side wall of the measurement borehole.

Each of the electrical images $I_1$ to $I_4$ can, in the (x,y) axis system, be considered as a matrix for points $M_{ij}$ with coordinates $(x_i,y_j)$, $x_i$ representing the azimuth of the electrode i generating the trace $T_i$ and $y_j$ the depth at which the measurement is taken by the electrode. The said points are separated from one another along the y axis by a distance equal to the sampling interval of the measuring tool and have a distance between them along the x axis representative of the difference in azimuth between two consecutive traces (lateral sampling shift). Each point $M_{ij}$ is assigned a value representative of the conductivity measured at the point with coordinates $(x_i,y_j)$ on the wall of the borehole, the said value being the amplitude of the trace $T_i$ at the point $M_{ij}$.

Figure 2:
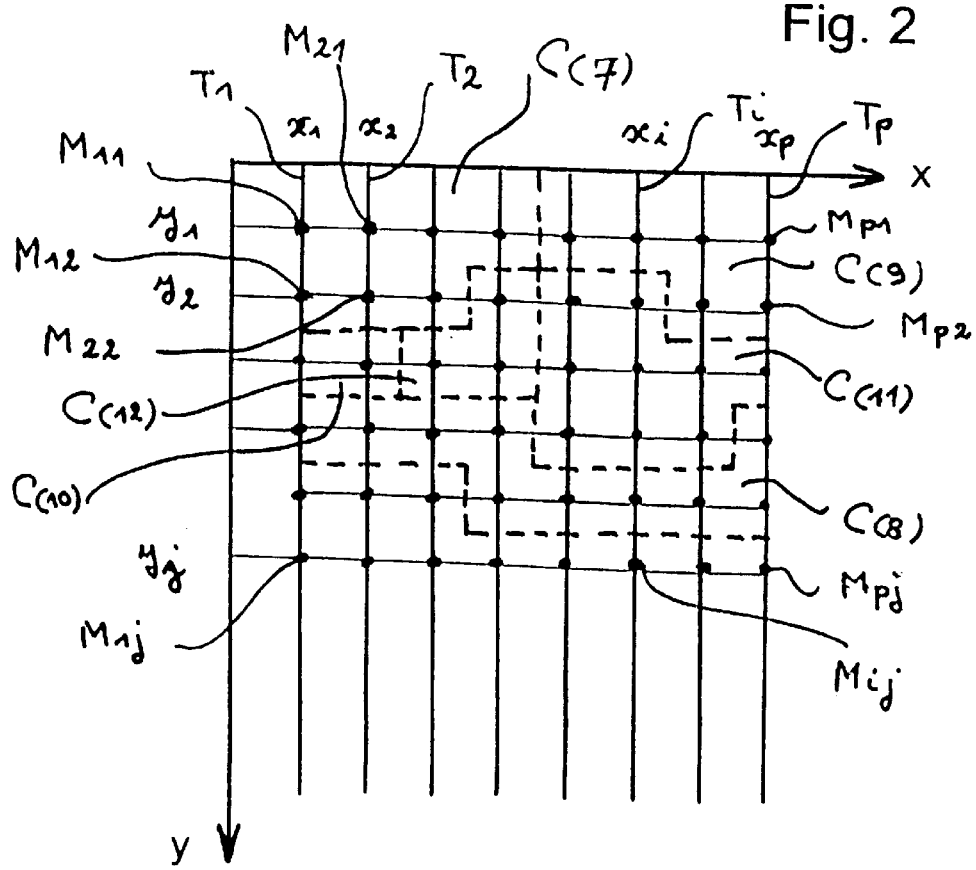
FIG. 2 schematizes the segmentation of an image in FIG. 1 into connected components.

In a first stage, each electrical image is segmented into connected components. To do this, a threshold $S_x$ is fixed, for example equal to the mean gradient $Gm^x$, along the x axis, of the image to be segmented, a threshold $S_y$, for example equal to the mean gradient $Gm^x$, along the y axis, of the image to be segmented and a threshold $S_m$, for example equal to the mean of the part greater than $Gm^x$ of the gradient along the x axis of the image to be segmented. As schematized in FIG. 2, a single zone, referred to as a connected component, is used to group the various points of the traces of the image to be segmented, for example $I_3$, which are such that any two points, for example $M_{11}$ and $M_{21}$, which neighbour one another in the said component along the x axis are assigned amplitudes which differ by a value lower than $S_x$, any two points, for example $M_{11}$ and $M_{12}$, which neighbour one another in the said component along the y axis are assigned amplitudes which differ by a value lower than $S_y$ and, when the said points are being grouped, the difference between the amplitude assigned to any new neighbouring point, for example $M_{22}$, which is a candidate for the group and the mean of the amplitudes assigned to the points which have already been grouped, for example $M_{11}$, $M_{12}$ and $M_{21}$, is below the threshold $S_m$. All the pixels in a given connected component are assigned an amplitude which is equal to the mean value of the amplitudes appertaining to the various points grouped in the connected component. FIG. 2 schematically shows six connected components C(12), C(11), C(10), C(9), C(8) and C(7), the number between parentheses indicating the mean amplitude value assigned to the connected component. As shown in the said FIG. 2, the connected components may each touch the two edges, right and left, of the image, as is the case for the connected component C(8), and they are then referred to as connected regions, or alternatively they touch only one edge, right or left, of the image, as is the case for the connected components C(7), C(9), C(10) and C(11), or may not touch either of the said edges, as is the case for the connected component C(12), in which case they are referred to as connected zones.

In a second stage, the set provided by the connected components resulting from the segmentation of the image is converted into a second set, consisting only of connected regions, that is to say, as indicated above, connected components which each touch the two edges, right and left, of the image, the said second set consisting of all the connected components which form connected regions and are already contained in the first set, and also connected regions which are formed from connected components in the first set which do not each touch the two edges, right and left, of the image, these being referred to as connected zones. The change from the connected zones to the connected regions derived from them is carried out by merging a connected zone of given mean amplitude value with the neighbouring connected zone having the next highest mean amplitude value, carrying out the merge gradually starting from the connected zone with the highest mean amplitude value and in decreasing order of mean amplitude value assigned to each connected zone, the mean amplitude value of the connected zone resulting from the merge of two neighbouring connected zones being recalculated before a new merge is carried out using the remaining connected zones including the said resultant connecting zone. Thus, with reference to FIG. 2, the connected zone C(12) is first merged with the connected zone C(11), then the connected zone resulting from this merge, the mean amplitude of which is equal to 11.25, is merged with the connected zone C(10). Together, the three merged connected zones C(12), C(11) and C(10) now touch the two edges, right and left, of the image and constitute a connected region. The two neighbouring connected zones C(9) and C(7) are then merged to form another connected region. At the end of the merge carried out on all the connected zones, a second set (image) is obtained which is formed only by connected regions.

Figure 3:
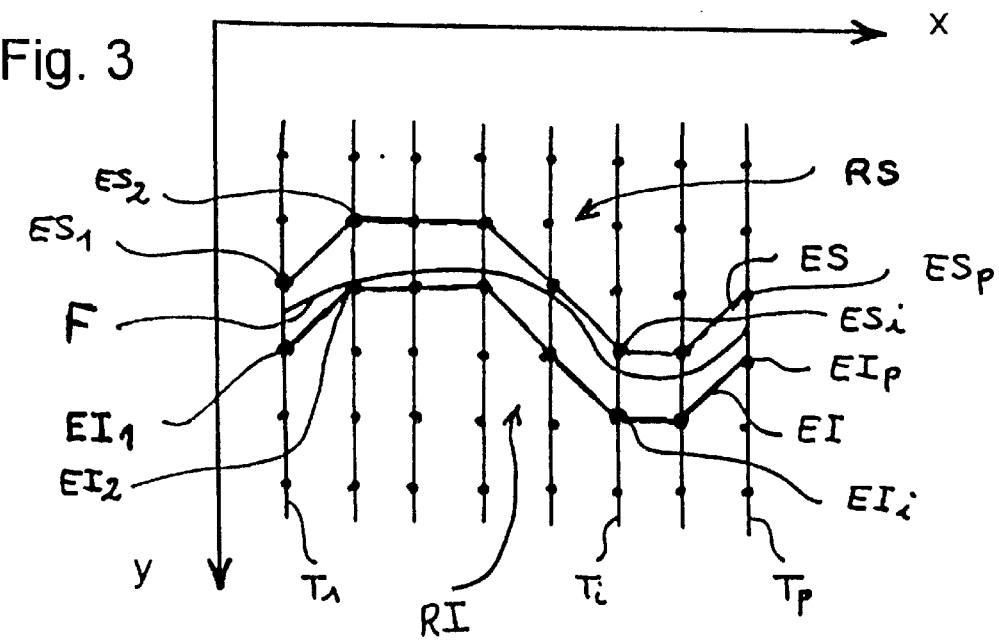
FIG. 3 schematically represents the boundary between two connected regions and the associated envelope contours.

On the basis of this set of connected regions, a smoothed contour is generated for each pair of adjacent connected regions, this contour marking the boundary between the two connected regions in the said pair. This is done by using contour tracking to find an upper envelope contour and a lower envelope contour for the said boundary and by keeping as the smoothed contour that of the two envelope contours which gives a lower variation in the level of the vertical shift (along y). Referring to FIG. 3, two adjacent (consecutive) connected regions RS and RI have a boundary F. Using a contour tracking technique, those points on the traces of the image which are closest to the boundary F above it (points such as $ES_1$, $ES_2$, ..., $ES_i$, ..., $ES_p$) and below it (points such as $EI_1$, $EI_2$, ..., $EI_i$, ..., $EI_p$) are determined. An upper envelope contour is formed by joining the points $ES_1$, $ES_2$, ..., $ES_i$, ..., $ES_p$, and a lower envelope contour is formed by joining the points $EI_1$, $EI_2$, ..., $EI_i$, ..., $EI_p$ and the contour kept as the smoothed boundary contour is the one of the two envelope contours which is the straightest, that is to say the one for which a lower value of the following expression is obtained:

$$\sum_{i=1}^{i=p-1} |y_i - y_{i+1}|$$

where $y_i$ and $y_{i+1}$ are the depth coordinates (along y) of any two consecutive points on the contour in question, and p is the number of traces in the image.

If need be, each connected region with smoothed contours, for which the number of constituent points is below a threshold, may be aggregated with the neighbouring connected region with smoothed contours having the closest mean amplitude value.

The connected regions with smoothed contours which are kept, assigned their mean amplitude value, may be represented in the (x,y) axis system to form an image, referred to as the bed image, associated with the wall image subjected to the segmentation. The contours which exist between connected regions and are present on this bed image, referred to as bedding contours, are each representative of a portion of the intersection of a bedding plane with the side wall of the measuring borehole.

Figure 4:
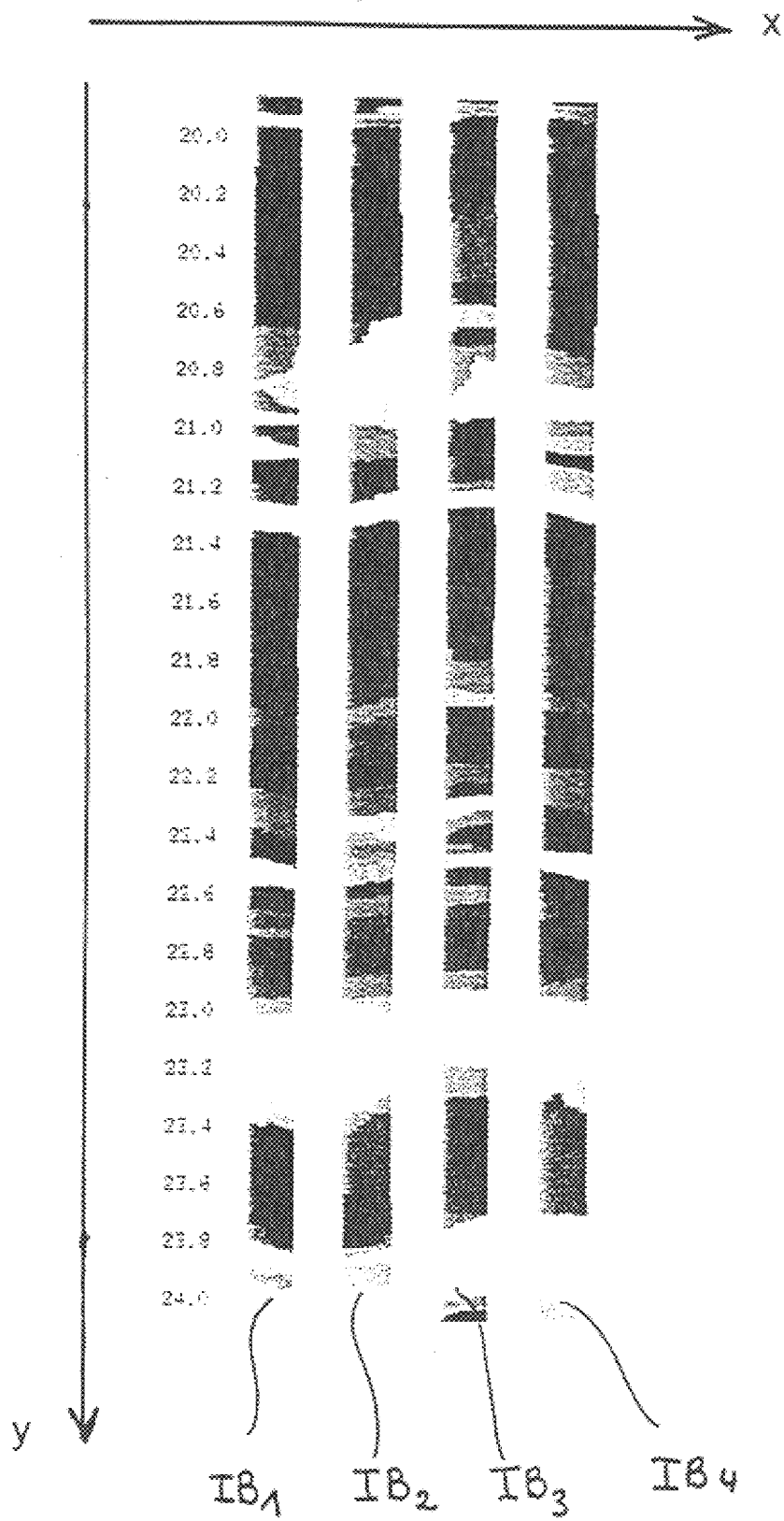
FIG. 4 represents the bed images associated with the electrical images in FIG. 1.

FIG. 4 represents, in the (x,y) axis system, the bed images $IB_1$, $IB_2$, $IB_3$ and $IB_4$ corresponding respectively to the electrical images $I_1$, $I_2$, $I_3$ and $I_4$ which are represented in FIG. 1 and are used to reconstruct the image of the side wall of the measuring borehole.

By using the four bed images $IB_1$, $IB_2$, $IB_3$ and $IB_4$, the contours (bedding contours) which have the same polarity and correspond to one another in the said bed images are then matched to construct sinusoids then representing the theoretical bedding boundaries.

Figure 5:
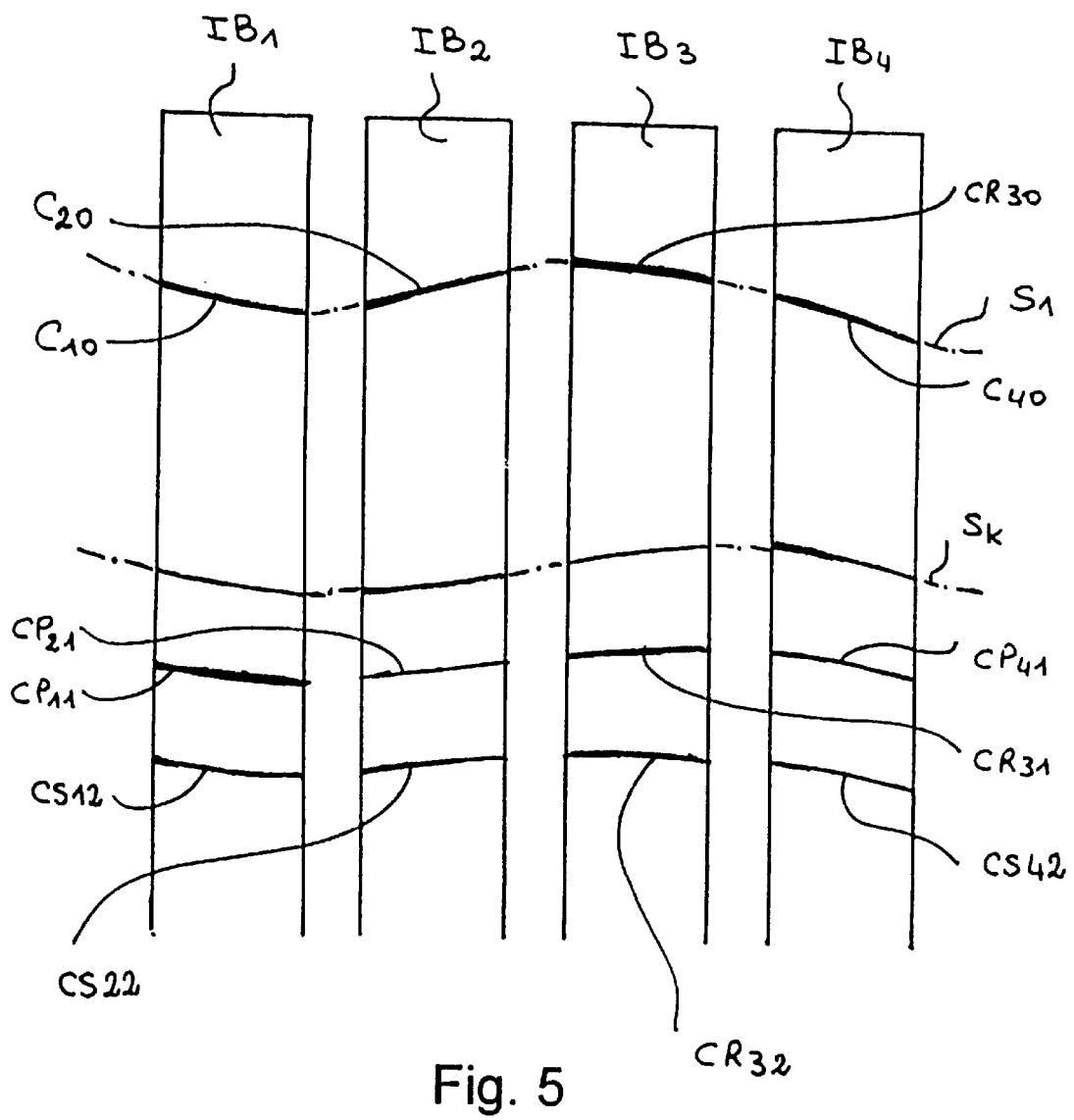
FIG. 5 schematically represents one way of matching contours present on the bed images to give a bed boundary sinusoid.

Referring to FIG. 5, this step of constructing the said bedding boundary sinusoids is carried out as follows, taking as the starting point for the operations the situation in which one bed boundary sinusoid $S_k$ has been determined.

Among the bedding contours (hereafter "contours") which are present on the four bed images $IB_1$, to $IB_4$ and lie below the sinusoid $S_k$, a first reference contour is selected, chosen from between the contour closest to $S_k$ and the contour encountered first after $S_k$, the said contour being the contour $CR_{31}$ located on the image $IB_3$. In the bed images $IB_1$, $IB_2$ and $IB_4$ which do not contain the reference contour $CR_{31}$, contours of the same polarity which correspond to the said first reference contour are then determined in order to form three primary contours, these three contours being the contour $CP_{11}$ in the image $IB_1$, the contour $CP_{21}$ in the image $IB_2$ and the contour $CP_{41}$ in the image $IB_4$.

All the sinusoids which each contain the first reference contour $CR_{31}$ and incorporate from one to three of the primary contours $CP_{11}$, $CP_{21}$ and $CP_{41}$ are then constructed, and the one of the said sinusoids constructed in this way which has the highest value $Q_1$, greater than a threshold $Q_s$, of a criterion Q representative of the quality of the bedding planes is kept as the optimum sinusoid $S_{01}$, the said criterion being, for example, the one which, as indicated above, incorporates five factors.

Then, on the bed image $IB_3$ containing the first reference contour $CR_{31}$, a second reference contour is selected which consists of the contour $CR_{32}$ which has the same polarity as the first reference contour and immediately follows it. In the bed images $IB_1$, $IB_2$ and $IB_4$ which do not contain the second reference contour $CR_{32}$ the contours of the same polarity which correspond to the second reference contour $CR_{32}$ and define three secondary contours are determined, these three contours being the contour $CS_{12}$ in the case of the image $IB_1$, the contour $CS_{22}$ in the case of the image $IB_2$ and the contour $CS_{42}$ in the case of the image $IB_4$.

All the sinusoids which each contain the second reference contour $CR_{32}$ and incorporate from one to three contours chosen from the secondary contours $CS_{12}$, $CS_{22}$ and $CS_{42}$ and the primary contours $CP_{11}$, $CP_{21}$ and $CP_{41}$, such that there is one contour per image for this choice, are then constructed and the one of the said sinusoids which has the highest value $Q_2$, greater than the threshold $Q_s$, of the quality criterion Q is kept as the optimum sinusoid $S_{02}$.

The optimum sinusoids $S_{01}$ and $S_{02}$ are compared, and the sinusoid $S_{01}$ is validated as the bed boundary $S_{k+1}$ if the sinusoid $S_{02}$ is parallel to the sinusoid $S_{01}$, or if it crosses $S_{01}$ and has a value $Q_2$ of the quality criterion below the value $Q_1$. If the optimum sinusoid $S_{01}$ is validated, the contours of this sinusoid are marked on the four bed images $IB_1$, $IB_2$, $IB_3$ and $IB_4$ and/or on the four corresponding wall images $I_1$, $I_2$, $I_3$ and $_4$, as the bed boundary $S_{k+1}$.

However, if the optimum sinusoid $S_{02}$ crosses the optimum sinusoid $S_{01}$ and has a value $Q_2$ of the quality criterion greater than the value $Q_1$, the optimum sinusoid $S_{01}$ is rejected and the reference contour $CR_{31}$ is eliminated.

The series of operations for matching contours is then repeated using the contours which are present on the four bed images and lie below the bed boundary sinusoid $S_{k+1}$, if the sinusoid $S_{01}$ has been validated, or below the bed boundary sinusoid $S_k$ if the sinusoid $S_{01}$ has not been validated, and up to the last contours to be matched which are present on the four bed images $IB_1$, $IB_2$, $IB_3$ and $IB_4$.

The procedure for obtaining the first bed boundary sinusoid $S_1$ is as follows.

On each of the four bed images $IB_1$ to $IB_4$, the first contour is selected and, among the said selected first contours, the contour with the least depth is chosen, in the present case the contour $CR_{30}$ on the image $IB_3$, as the reference contour. In the bed images $IB_1$, $IB_2$ and $IB_4$ which do not contain the reference contour, the contours of the same polarity which correspond to the reference contour and define three primary contours are then determined, namely contour $C_{10}$ on the image $IB_1$, contour $C_{20}$ on the image $IB_2$ and contour $C_{40}$ on the image $IB_4$. Using the said primary contours $C_{10}$, $C_{20}$ and $C_{40}$ and the reference contour $C_{30}$, the bed boundary sinusoid $S_1$ is constructed either (i) by picking, if the said four contours are clearly marked and allow such picking to be carried out, or (ii) by applying the process described above for determining the sinusoid $S_{k+1}$.

For a depth interval different from the one indicated in FIGS. 1 and 5, images 6a and 6b show bed boundary sinusoids marked on the FMS wall images (FIG. 6a) and the images of the associated connected regions representing the bedding (FIG. 6b).

What is claimed is:

1. Method for automatically determining the bedding in a formation, from images of boreholes or developments of core samples of this formation, each image being representative of a slice of the side wall of the borehole or of the core sample, with reference to a vertical axis y for depth and a horizontal axis x for azimuth, and being defined by a plurality of traces or columns, each of which is directed along the y axis from points spaced along the x axis and represents the value of a parameter associated with a characteristic of the said wall, measured as a function of depth, the side wall of the borehole or of the core sample being reconstructed by combining N wall images, the said method being characterized in that it consists in:

segmenting each of the N wall images which are used to reconstruct the image of the side wall of the borehole or of the core sample, into a first set of connected components, each connected component consisting of a homogeneous zone of points which is obtained by grouping points of the traces of the wall image in such a way that the difference in the values taken by a criterion associated with the imaged characteristic at any two neighbouring points in the said zone has a value below a threshold, assigning a unique coefficient to all the pixels in a given connected component, converting the first set of connected components into a second set consisting only of connected components, referred to as connected regions, which each touch the two edges, right and left, of the image, the said connected regions consisting of all the connected components forming connected regions which are already contained in the first set, and also connected regions which are formed from the connected components of the first set which do not each touch the two edges, right and left, of the image, referred to as connected zones, by merging a given connected zone with the closest neighbouring connected zone, carrying out the merge gradually and, after each merge of two connected zones, reassigning a new coefficient to the resultant connected zone before carrying out a new merge using the remaining connected zones including the said resultant connected zone, for each pair of consecutive connected regions, generating a smoothed contour marking the boundary of the two connected regions of the said pair by using contour tracking to find an upper envelope contour and a lower envelope contour for the said boundary and by keeping as the smoothed contour that of the two envelope contours which gives a lower variation in the level of the vertical shift; and producing in the (x,y) axis system an image formed by the connected regions with smoothed contours which are kept, this image being referred to as the bed image associated with the wall image subjected to the segmenting, and the contours between adjacent connected regions present on this bed image, referred to as bedding contours, each being representative of a portion of the intersection of a bedding plane with the side wall of the borehole or of the core sample.

2. Method according to claim 1, characterized in that the criterion associated with the imaged characteristic is a parameter, in particular amplitude, associated with the said characteristic.

3. Method according to claim 2, characterized in that the unique coefficient assigned to all the pixels of a given connected component is the mean value of the parameter, in particular amplitude, associated with the imaged characteristic for the trace points grouped in the said connected component.

4. Method according to claim 3, characterized in that the connected zones are merged by grouping a connected zone having a given mean value of the parameter with the neighbouring connected zone which has the next highest mean value of the parameter, carrying out the merge gradually, starting from the connected zone having the highest mean value of the parameter and in decreasing order of the parameter mean value assigned to each connected zone, and after each merge of two connected zones, recalculating the mean value of the parameter of the resultant connected zone before carrying out a new merge using the remaining connected zones including the said resultant connected zone.

5. Method according to claim 1, characterized in that it furthermore consists in aggregating each connected region having smoothed contours, for which the number of constituent points is below a threshold, with the closest neighbouring connected region having smoothed contours, for example the one having the closest mean value of the parameter.

6. Method according to claim 1, characterized in that it includes the further step consisting, using N bed images which are each derived from one of the N wall images used to reconstruct the side wall of the borehole or of the core sample, in matching the bedding contours of the same polarity which correspond to one another in the said N bed images, in order to construct sinusoids representing the bedding boundaries.

7. Method according to claim 6, characterized in that the step of matching the bedding contours, hereafter referred to as contours, to construct the bedding boundary sinusoids is implemented by carrying out a series of operations which, taking as a starting point the situation in which one bed boundary sinusoid $S_k$ has been determined, consists in:

a) selecting, from the contours which are present in the N bed images and lie below the sinusoid $S_k$, a first reference contour chosen from between the contour closest to $S_k$ and the contour encountered first after $S_k$;

b) determining, in the bed images which do not contain the first reference contour, the contours of the same polarity which correspond to the said first reference contour and represent N−1 primary contours;

c) constructing all the sinusoids which each contain the first reference contour and incorporate a number of the said primary contours ranging from 1 to N−1, and keeping as the optimum sinusoid $S_{01}$ the one of the said sinusoids which has the highest value $Q_1$, greater than a threshold $Q_s$, of a criterion Q representative of the quality of the bedding planes;

d) selecting, on the bed image containing the first reference contour, a second reference contour consisting of the contour which has the same polarity as the first reference contour and immediately follows it;

e) determining, in the bed images which do not contain the second reference contour, the contours of the same polarity which correspond to the second reference contour and define N−1 secondary contours;

f) constructing all the sinusoids which each contain the second reference contour and incorporate from 1 to N−1 contours chosen from the set of all the primary and secondary contours, so that there is one contour per image for this choice, and keeping as the optimum sinusoid $S_{02}$ the one of the said sinusoids which has the highest value $Q_2$, greater than the threshold $Q_s$, of the quality criterion Q;

g) comparing the optimum sinusoids $S_{01}$ and $S_{02}$ and (i) validating the sinusoid $S_{01}$ as the bed boundary $S_{k+1}$ if the sinusoid $S_{02}$ is parallel to $S_{01}$ or if it crosses $S_{01}$ and has a value $Q_2$ of the quality criterion below $Q_1$, and marking the contours of the validated sinusoid $S_{01}$ on the N bed images as the bed boundary $S_{k+1}$ or (ii) rejecting the optimum sinusoid $S_{01}$ and eliminating the first reference contour if the optimum sinusoid $S_{02}$ crosses the sinusoid $S_{01}$ and has a value $Q_2$ of the quality criterion greater than the value $Q_1$; and h) repeating the series of operations a) to g) using the contours which are present on the N bed images and lie below the sinusoid $S_{k+1}$, in the case of operations according to g(i), or below the sinusoid $S_k$ in the case of operations according to g(ii), and as far as the last contours to be matched which are present on the N bed images.

8. Method according to claim 7, characterized in that the first bed boundary sinusoid $S_1$ is obtained by performing the sequence of operations consisting in:

selecting, on each of the N bed images, the first contour, choosing, from the said selected first contours, the contour having least depth as the reference contour, determining, in the bed images which do not contain the reference contour, the contours of the same polarity which correspond to the reference contour and define N−1 primary contours; and constructing the optimum sinusoid $S_1$ either (α) by picking or (β) by applying the process according to points c) to g).

9. Method according to claim 1, characterized in that, during the segmentation of each wall image into connected components, the grouping of points of the traces of the wall image in a homogeneous zone constituting a connected component is carried out in such a way that the difference in the values taken by a parameter associated with the imaged characteristic, in particular the amplitude of the said characteristic, at any two neighbouring points in the said zone has a value below a threshold S and, during the said grouping, the difference between the value of the parameter at a new point to be grouped and the mean of the values of the said parameter for the points already grouped also has a value below a threshold $S_m$.

10. Method according to claim 1, characterized in that, during the segmentation of each wall image into connected components, the grouping of points of the traces of the wall image into a homogeneous zone constituting a connected component is carried out in such a way that the difference in the values taken by the parameter associated with the imaged characteristic, for example the amplitude of the said characteristic at any two neighbouring points in the said zone along the x axis has a value below a threshold $S_x$, the difference in the values taken by the said parameter at any two neighbouring points in the zone along the y axis has a value below a threshold $S_y$, and the difference between the value of the parameter at a new point to be grouped and the mean of the values of the said parameter for the points already grouped also has a value below a threshold $S_m$.

11. Method according to claim 10, characterized in that the threshold $S_x$ has a value greater than the threshold $S_y$.

12. Method according to claim 10, characterized in that the threshold $S_m$ has a value greater than the threshold $S_x$.

13. Method according claim 1, characterized in that, before they are segmented into connected components, the wall images are subjected to filtering to remove planar heterogeneities of the open fracture type.

14. Method according to claim 7, characterized in that the correspondence between the reference contour and the N−1 contours of the same polarity as the reference contour is effected in such a way that the variation in thickness of the bed bounded at the top by the said contours, when passing from the image containing the reference contour to any one of the other images, is below a threshold.

15. Method according to claim 1, characterized in that the wall images consist of images, in particular electrical images, of the wall of boreholes drilled in a geological formation.

16. Method according to claim 1, characterized in that the wall images consist of images of developments of core samples taken from a geological formation.

* * * * *